(12) United States Patent
Barrenscheen et al.

(10) Patent No.: US 9,160,559 B2
(45) Date of Patent: Oct. 13, 2015

(54) SYSTEM AND METHOD TO ADDRESS DEVICES CONNECTED TO A BUS SYSTEM

(75) Inventors: Jens Barrenscheen, Munich (DE);
Ansgar Pottbaecker, Grafing (DE);
Fabrizio Cortigiani, Vigonza (IT)

(73) Assignee: Infineon Technologies, AG, Neubiberg (DE)

(*) Notice: Subject to any disclaimer, the term of this patent is extended or adjusted under 35 U.S.C. 154(b) by 113 days.

(21) Appl. No.: 13/473,236

(22) Filed: May 16, 2012

(65) Prior Publication Data

US 2013/0311691 A1 Nov. 21, 2013

(51) Int. Cl.
*G06F 13/00* (2006.01)
*H04L 12/403* (2006.01)
*H04L 29/12* (2006.01)
*H04L 12/26* (2006.01)
*H04L 12/40* (2006.01)

(52) U.S. Cl.
CPC .......... *H04L 12/403* (2013.01); *H04L 61/2038* (2013.01); *H04L 43/50* (2013.01); *H04L 2012/40234* (2013.01); *Y04S 40/168* (2013.01)

(58) Field of Classification Search
CPC ............ H04L 61/20; H04L 2012/40234; H04L 29/12207; H04L 12/403; H04L 43/50
USPC .......................................... 701/29; 710/110, 3
See application file for complete search history.

(56) References Cited

U.S. PATENT DOCUMENTS

| 7,904,219 | B1 * | 3/2011 | Lowrey et al. ............... 701/32.3 |
| 2004/0221213 | A1 * | 11/2004 | Sawyer et al. ............... 714/724 |
| 2005/0132109 | A1 | 6/2005 | Steger |
| 2005/0267659 | A1 * | 12/2005 | Sunaga et al. ............... 701/36 |
| 2006/0190648 | A1 * | 8/2006 | Larisch et al. ............... 710/110 |
| 2006/0224776 | A1 | 10/2006 | Vanderhenst |
| 2006/0282549 | A1 * | 12/2006 | Vinnemann ................... 710/3 |
| 2009/0172242 | A1 * | 7/2009 | Piasecki ...................... 710/317 |
| 2011/0125945 | A1 * | 5/2011 | Link et al. ................... 710/110 |
| 2013/0073761 | A1 * | 3/2013 | Nierop et al. ................ 710/110 |

FOREIGN PATENT DOCUMENTS

WO     2005053236 A1    6/2005

* cited by examiner

*Primary Examiner* — Ernest Unelus
(74) *Attorney, Agent, or Firm* — Slater & Matsil, L.L.P.

(57) ABSTRACT

A system includes a bus system, such as a LIN bus system. A number of components are connected to the bus system. A first component of the components is configured to detect a direction of a current to detect a location of the first component in the bus system. Each of the components can have a unique address.

22 Claims, 3 Drawing Sheets

SYSTEM AND METHOD TO ADDRESS DEVICES CONNECTED TO A BUS SYSTEM

TECHNICAL FIELD

The invention generally relates to an electrical or electronic system, and in specific embodiments, to a system and method to address devices connected to a bus system, for example, a LIN-Bus.

BACKGROUND

In electrical or electronic systems, various individual system modules, for instance various electronic/electric assemblies/devices, various electronic/electric components, for instance various semi-conductor components such as integrated circuits, etc., various sub-components, provided in one and the same component or integrated circuit etc., communicate via a transfer medium such as a bus system.

A bus system may comprise one or more transfer lines. Bus systems can be used jointly by several, in particular by two or more than two components of a respective system.

Many conventional bus systems comprise several partial systems, for example a data bus that consists of one or more data lines, and/or an address bus that consists of one or more address lines, and/or a control bus that consists of one or more control lines.

In comparison to this, other bus systems are of a much simpler construction. For example, CAN bus systems (CAN=Controller Area Network) in general only comprise two or three lines (e.g., CAN_HIGH, CAN_LOW, and—optionally—CAN_GND (ground)).

Further, LIN bus systems (LIN=Local Interconnect Network) are known, which are even simpler. A LIN bus system 1 is shown in FIG. 1. In general, a LIN bus only comprises a single transmission line 2, to which a plurality of components 3a, 3b, 3c, 3d are connected. Consequently both useful data and address and/or control data are transmitted via the LIN bus transmission line 2.

LIN bus systems, in general, are based on a master/slave architecture, where one component (in FIG. 1, the component 3a) acts as a master, and the other components (in FIG. 1, the components 3b, 3c, 3d) act as slaves.

To establish a communication in a LIN bus system, each slave 3b, 3c, 3d of a LIN bus system has an own slave identification number or address (SL_ID_x, in FIG. 1: SL_ID_1, SL_ID_2, SL_ID_3). For a non-ambiguous assignment and data flow, each slave address should be unique in a LIN bus system. In other words, slaves can only be addressed independently if each of them has a unique slave address.

In some cases, especially when several identical components are connected to the same LIN bus system, it is of advantage not to use hardcoded unique slave addresses, since this would significantly increase the costs of logistics for ordering, assembly, stock etc. of the respective components. As a result, some LIN slave modules connected to a LIN bus system may not have unique slave addresses, but may have a common default address (in the following indicated as SL_ID_0).

In these cases, the functionality of such a module may be defined by its location in the LIN bus system (e.g., two similar door modules may be used, one for the front door, and one for the back door, etc.). Further, in these cases, a task of the master module is to identify the connected slave modules and to distribute unique slave addresses to those modules that have a common default address. This mechanism is called auto-addressing. An example for an auto-addressing method is, e.g., described in the U.S. 2005/0132109 A1.

However, common auto-addressing methods all have some drawbacks.

For these or other reasons there is a need for improved systems and methods to address devices connected to a bus system, in particular, a LIN-Bus.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the invention. Other embodiments of the present invention and many of the intended advantages of the present invention will be readily appreciated, as they become better understood by reference to the following detailed description.

DETAILED DESCRIPTION OF ILLUSTRATIVE EMBODIMENTS

In the following detailed description, reference is made to the accompanying drawings, which form a part hereof, and in which is shown by way of illustration specific embodiments in which the invention may be practiced. It is to be understood that other embodiments may be utilized and structural or other changes may be made without departing from the scope of the present invention. The following detailed description, therefore, is not to be taken in a limiting sense, and the scope of the present invention is defined by the appended claims.

Figure 1:
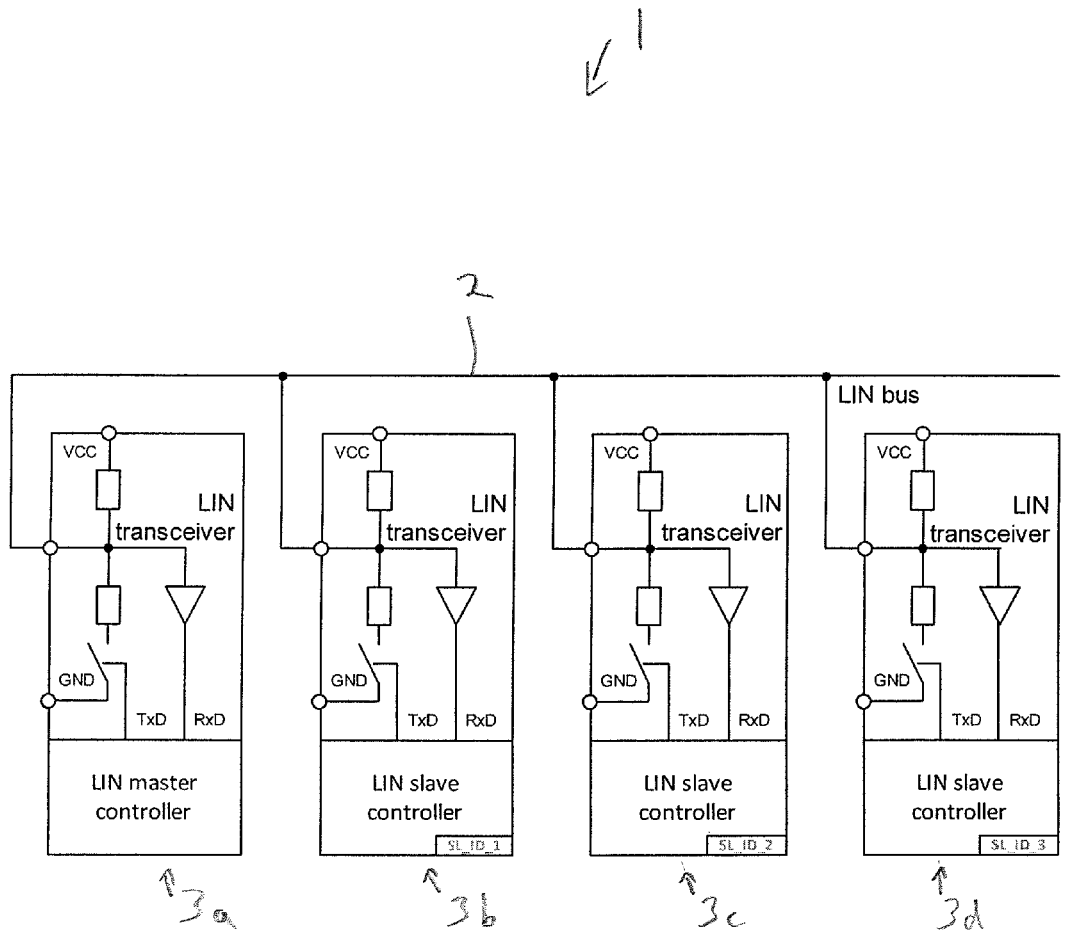
FIG. 1 depicts a schematic structure of a conventional electronic/electric system comprising a plurality of components that are connected to a LIN-Bus.
Figure 2:
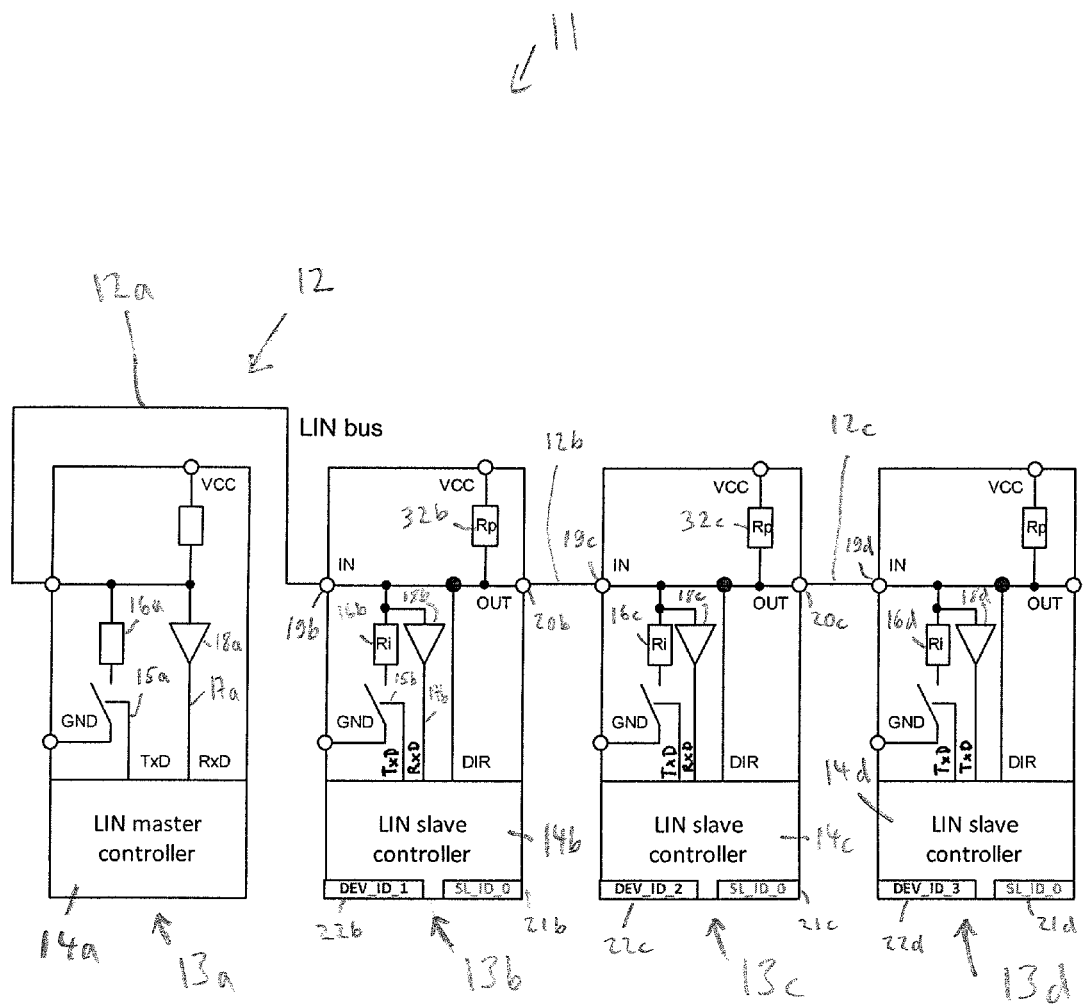
FIG. 2 depicts a schematic structure of a first state of an electronic/electric system according to an embodiment of the invention comprising a plurality of components that are connected to a LIN-Bus.

FIG. 2 shows a schematic structure of a first state of system 11 according to an embodiment of the invention. The system 11 can be any electronic/electric system.

In the system 11 shown in FIG. 2, various individual system modules 13a, 13b, 13c, 13d, for instance various electronic/electric assemblies/devices, various electronic/electric components, for instance various semi-conductor components such as integrated circuits, etc., various sub-components, provided in one and the same component or integrated circuit etc., communicate via a transfer medium such as a bus system 12.

The bus system 12 may, e.g., be a LIN bus system (LIN=Local Interconnect Network) comprising one single transmission line 12a, to which the above plurality of components 13a, 13b, 13c, 13d and, e.g., one or more additional components (not shown) are connected. The components 13 can include any modules, devices, elements or other components. Alternatively, bus systems different from a LIN bus system may be used, and/or bus systems with more than one transmission line, e.g., two or three or more transmission lines, etc.

Some of the components connected to the bus system 12, e.g., the above components 13b, 13c, 13d may be identical or substantially identical, and other components, e.g., the above additional components (not shown) may be different from one another.

The bus system 12, in particular the LIN bus system 12 shown in FIG. 2 may be based on a master/slave architecture, where one component (here, e.g., the component 13a) acts as a master, and the other components (here, e.g., the components 13b, 13c, 13d, and/or, e.g., further components (not shown)) act as slaves.

The component acting as a master may, e.g., comprise a LIN master controller 14a, and each of the components 13b, 13c, 13d acting as a slave may, e.g., comprise a respective LIN slave controller 14b, 14c, 14d.

As is shown in FIG. 2, the LIN master controller 14a may transmit data (TxD) over the LIN bus system 12, e.g., via a line 15a, and via a respective data transmission resistor 16a connected between the line 15a, and the above transmission line 12a of the LIN bus system 12.

Further, as is also shown in FIG. 2, the LIN master controller 14a may receive data (RxD), e.g., via a line 17a, which, e.g., may be connected to the above transmission line 12a of the LIN bus system 12 via a respective data reception amplifier 18a.

Correspondingly similar, as is also shown in FIG. 2, a respective LIN slave controller 14b, 14c, 14d may transmit data (TxD) over the LIN bus system 12, e.g., via a respective line 15b, and via a respective data transmission resistor 16b connected between the line 15b, and the above transmission line 12a of the LIN bus system 12.

Still further, as is also shown in FIG. 2, each LIN slave controller 14b, 14c, 14d may receive data (RxD), e.g., via a respective line 17b, which, e.g., may be connected to the above transmission line 12a of the LIN bus system 12 via a respective data reception amplifier 18b.

As is shown in FIG. 2, the slave components 13b, 13c, 13d may be connected to the LIN bus system 12 in a chain-like structure, wherein the first slave component 13b is connected between the master component 13a and the other slave components 13c, 13d, the second slave component 13c is connected between the first slave component 13b and the third slave component 13d, etc.

In more detail, the above data transmission resistor 16b and the above data reception amplifier 18b of the first slave component 13b may, e.g., be connected to an IN-connection 19b and an OUT-connection 20b of the first slave component 13b, wherein the IN-connection 19b of the first slave component 13b is directly connected to the transmission line 12a of the LIN bus system 12, and the OUT-connection 20b of the first slave component 13b is connected to a corresponding IN-connection 19c of the second slave component 13c via a line 12b.

Further, as is also shown in FIG. 2, a data transmission resistor 16c and a data reception amplifier 18c of the second slave component 13c may, e.g., be connected to the above IN-connection 19c of the second slave component 13c, and to an OUT-connection 20c of the second slave component 13c. Thereby, as mentioned, the IN-connection 19c of the second slave component 13c is connected to the OUT-connection 20b of the first slave component 13b via the line 12b, and the OUT-connection 20c of the second slave component 13c is connected to a corresponding IN-connection 19d of the third slave component 13d via a line 12c.

Still further, a data transmission resistor 16d and a data reception amplifier 18d of the third slave component 13d may, e.g., be connected to the above IN-connection 19d of the third slave component 13d, and to an OUT-connection thereof.

A logical 0 may, e.g., be generated on the LIN bus line 12a by activating a respective one of the above lines 15a, 15b, whereas a logical 1 may be generated by respective pull-up resistor components Rp/current sources 32b, 32c. A respective component Rp being generally active, a current flows on the LIN bus line from the component Rp to a respective ground (GND) connection of a component sending a logical 0.

In the above first state of the system 11 shown in FIG. 2, two or more of the above slave components (here: the above first, second, and third slave components 13b, 13c, 13d) do not yet have an own, unique slave identification number or address SL_ID_x.

Instead, in the above first state of the system 11, the above slave components 13b, 13c, 13d have a common default address SL_ID_0, stored in a respective memory area 21b, 21c, 21d of the respective components 13b, 13c, 13d.

To the contrary, other components connected to the bus system 12 (not shown in FIG. 2), in the above first state already, may have respective hardcoded unique slave addresses (i.e., slave addresses each of which being unique in the system 11).

Further, in the above first state of the system 11, the location of the components 13b, 13c, 13d in the system 11, in particular, the bus system 12 is not yet known.

In a first step of a method according to an embodiment of the invention, as will be described in further detail below, unique slave addresses are assigned to the components having a common default address SL_ID_0, and supporting the method described herein (here: the slave components 13b, 13c, 13d). Thereafter, in a second step, as will also be described in further detail below, after having assigned unique slave addresses to all slave components, the position/location of the slave components in the LIN bus system 12 is detected.

At the beginning of the first step, under control of the LIN master controller 14a, the master component 13a may transmit respective command data over the LIN bus system 12 to the slave components 13b, 13c, 13d which indicates that the slave components 13b, 13c, 13d (in particular, the slave components that do not yet have an own, unique slave address) shall send their respective device identification numbers (DEV_ID_x) to the master component 13a.

As is shown in FIG. 2, the device identification number (DEV_ID_x) of each slave component 13b, 13c, 13d is unique (in particular, unique in the system 11), and may consist of a predefined number of bits, e.g., stored in a respective memory area 22b, 22c, 22d, e.g., a respective non-volatile memory area of the respective components 13b, 13c, 13d.

The values of the bits of the respective device identification number (e.g., DEV_ID_1 for the first slave component 13b, DEV_ID_2 for the second slave component 13c, DEV_ID_3 for the third slave component 13d) may be entered by various means, such as pin strapping (where, e.g., unused pins of the components may be connected to different potentials, leading, e.g., to differently constructed components, etc.), by the generation of a random number within the components, etc., etc. Alternatively, a respective device identification number may, e.g., be placed into the above non-volatile memory area 22b, 22c, 22d of a respective device control IC, e.g., the above LIN slave controller 14b, 14c, 14d in the course of respective production tests or test processes for the components. Suitable memories for the above non-volatile memory areas 22b, 22c, 22d, e.g., are fuses (electrical or optical), OTP arrays, EEPROMs, Flash memories or other types of memories, depending on the respectively used technology.

In response to receiving the above command from the master component 13a, the above slave components 13b, 13c, 13d (in particular, the slave components that do not yet have an own unique slave address), under control of the respective LIN slave controller 14b, 14c, 14d, transmit their respective device identification number (e.g., stored in the above memory area 22b, 22c, 22d) over the LIN bus system 12 to the master component 13a.

Thereby, e.g., the first slave component 13b may send its respective device identification number (here: DEV_ID_1) at the same time or at substantially the same time or at least partially at the same time as the other slave components, e.g., at the same time as the second and third slave component 13c, 13d send their respective device identification numbers (here: DEV_ID_2, and DEV_ID_3). For instance, the slave components 13b, 13c, 13d may all send their respective device identification number during the data field of the LIN protocol.

Due to the wired-AND structure of the LIN bus system 12, a logical 0 (dominant level) sent over the bus system 12 may overrule a logical 1 (recessive level) sent over the bus system 12 at the same or substantially the same time.

Each slave component 13b, 13c, 13d that sends its respective device identification number over the bus system 12 may compare the data actually present on the bus system 12 during the data field of the LIN protocol with the device identification number actually sent by a respective component 13b, 13c, 13d.

If the respective slave component 13b, 13c, 13d detects that the identification number data actually present on the bus system 12 does not correspond with the device identification number actually sent by the respective slave component 13b, 13c, 13d (e.g., the device identification number stored in its respective non-volatile memory 22b, 22c, 22d), the respective slave component 13b, 13c, 13d may detect that its currently sent device identification number is overruled by another (lower, dominant) device identification number of another slave component sent over the bus system 12 at the same or substantially the same time.

In this case, the respective slave component 13b, 13c, 13d may stop to transmit its respective (higher, non-dominant) device identification number over the bus system 12.

Hence, in response to the above command of the master component 13a indicating that the slave components 13b, 13c, 13d shall send their respective device identification numbers (DEV_ID_x) over the bus system 12, the master component 13a receives that device identification number of that slave component 13b, 13c, 13d that is dominant with regards the other identification numbers of the other slave components 13b, 13c, 13d.

Figure 3:
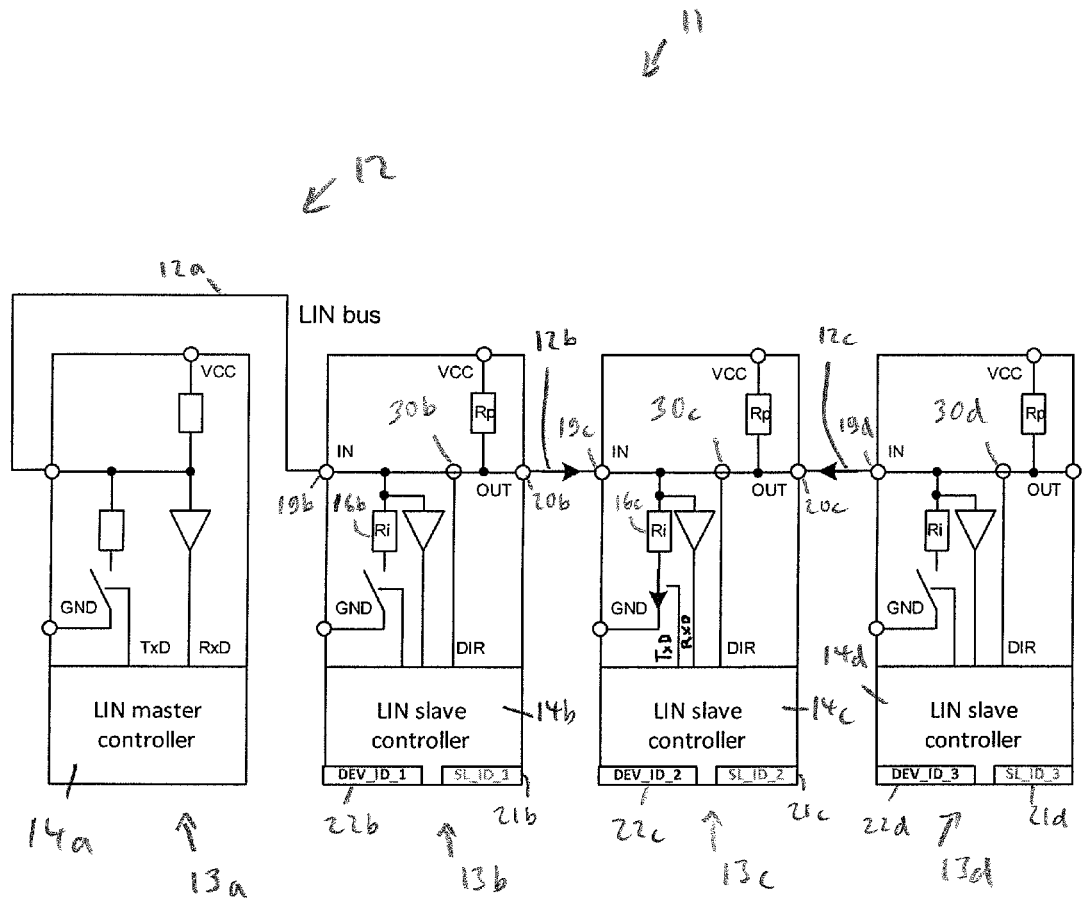
FIG. 3 depicts a schematic structure of a second state of the electronic/electric system shown in FIG. 2.

Thereafter, the master component 13a may assign a unique slave identification number or address (e.g., the slave identification number SL_ID_1, as shown in FIG. 3) to the slave component 13b, 13c, 13d with the dominant device identification number, e.g., the first slave component 13b with the dominant device identification number (DEV_ID_1). Thereby, a received unique dominant device identification number (here: DEV_ID_1) may be mapped to a respective unique slave identification number or address (here: SL_ID_1).

Then, the master component 13a may transmit the assigned unique slave identification number or address SL_ID_1 over the LIN bus system 12.

The slave component with the above dominant device identification number (here: the first slave component 13b with the dominant device identification (DEV_ID_1)) receives the assigned slave identification number or address (here: SL_ID_1) via the LIN bus system 12, and, as is shown in FIG. 3, stores the received assigned unique slave identification number or address (here: SL_ID_1) in its above memory area 21b. In other words, and as is shown in FIGS. 2 and 3, in the memory area 21b of the slave component 13b, the common default address SL_ID_0 previously stored therein is replaced by the assigned unique slave identification number or address (here: SL_ID_1).

Thereafter, the above steps may be repeated: the master component 13a may again transmit respective command data over the LIN bus system 12 to the slave components 13b, 13c, 13d which indicates that those slave components (here: the second and third slave components 13c, 13d) that do not yet have an own, unique slave address shall send their respective device identification numbers (DEV_ID_x) to the master component 13a.

In response to receiving the above command from the master component 13a, the second and third slave components 13c, 13d, as they do not yet have an own unique slave address, under control of the respective LIN slave controller 14c, 14d, may transmit their respective device identification number (e.g., stored in the above memory area 22c, 22d) over the LIN bus system 12 to the master component 13a.

Due to the wired-AND structure of the LIN bus system 12, correspondingly similar as explained above, the master component 13a then receives that device identification number of that slave component (e.g., the device identification number DEV_ID_2 of the slave component 13c) that is dominant with regards the other identification number of the other slave component (e.g., the device identification number DEV_ID_3 of the slave component 13d).

Thereafter, the master component 13a may assign a unique slave identification number or address (e.g., the slave identification number SL_ID_2, as shown in FIG. 3) to the slave component with the dominant device identification number, e.g., the second slave component 13c.

Then, the master component 13a may transmit the assigned slave identification number or address SL_ID_2 over the LIN bus system 12.

The slave component with the above dominant device identification number (here: the second slave component 13c with the dominant device identification (DEV_ID_2)) receives the assigned slave identification number or address (here: SL_ID_2) via the LIN bus system 12, and, as is shown in FIG. 3, stores the received assigned unique slave identification number or address (here: SL_ID_2) in its above memory area 21c. In other words, and as is shown in FIGS. 2 and 3, in the memory area 21c of the slave component 13c, the common default address SL_ID_0 previously stored therein is replaced by the assigned unique slave identification number or address (here: SL_ID_2).

The above procedure is again repeated, till all slave components—as is shown in FIG. 3—have their own, unique, non-ambiguous slave identification number or address (SL_ID_1, SL_ID_2, SL_ID_3) under which they can be addressed in the future (e.g., by the master component 13a).

Thereafter, in a second step of a method according to an embodiment of the invention, as will be described in further detail below, the position/location of the slave components in the LIN bus system 12 may be detected.

At the beginning of the second step, under control of the LIN master controller 14a, the master component 13a may transmit respective command data over the LIN bus system 12 to one of the slave components, e.g., as shown in FIG. 3, the second slave component 13c which indicates that the respective slave component 13c shall apply a respective test signal for position evaluation, e.g., a logical 0 (i.e., the above dominant level) to the LIN bus system 12. Thereby, to address the respective slave component 13c, its respective slave identification number or address (here: SL_ID_2) may be used.

As is shown in FIG. 3, in response to receiving the above command from the master component 13a, and the above slave identification number or address (here: SL_ID_2), the respectively addressed slave component (here: the second slave component 13c)—under control of the respective LIN slave controller 14c—applies the above dominant logical level (i.e., a logical 0) to the LIN bus system 12. The applied 0 level of the test signal for position evaluation can be part of a data transfer from the addressed slave component to the requesting master component 13a.

Due to this, as is shown in FIG. 3, the addressed second slave component 13c acts as a current sink. As depicted by respective arrows in FIG. 3, current flows, e.g., via the LIN bus transmission line 12a to the IN-connection 19b of the first slave component 13b, then through the first slave component 13b to its OUT-connection 20b, then via the line 12b to the IN-connection 19c of the second slave component 13c, and via its data transmission resistor 16c to ground (GND). Correspondingly similar, due to the applied logical 0, current, e.g., flows through the third slave component 13d to its IN-connection 19d, then via the line 12c to the OUT-connection 20c of the second slave component 13c, and via its data transmission resistor 16c to ground (GND).

As is shown in FIG. 3, observation points 30b, 30c, 30d are provided in the LIN bus system 12, in particular, in each of the above slave components 13b, 13c, 13d.

In each of the observation points 30b, 30c, 30d, by a respective associated slave component 13b, 13c, 13d, the direction of the above current caused by the logical 0 applied to the LIN bus system 12 by the second slave component 13c is detected. In particular, it may be detected whether the above current in a respective slave component flows from its IN- to its OUT-connection, or vice versa. Thereby, the respective slave component 13b, 13c, 13d may detect whether the current sink, i.e., the slave component applying the logical 0 to the LIN bus system 12 is connected to its IN-connection, i.e., is located at its "IN" side, or is connected to its OUT-connection, i.e., is located at its "OUT" side.

For instance, if the above current flows from an IN- to an OUT-connection of a respective slave component (as in FIG. 3, e.g., is the case for the first slave component 13b, where the current flows from the "left" to the "right" through the above observation point 30b), the respective slave component 13b may detect that the current sink, i.e., the slave component applying the logical 0 to the LIN bus system 12 is connected to its OUT-connection 20b, i.e., is located at its "OUT" side. Vice versa, if the above current flows from the inside of a respective slave component to its respective IN-connection (as in FIG. 3, e.g., is the case for the third slave component 13d, where the current flows from the "right" to the "left" through the above observation point 30d), the respective slave component 13d may detect that the current sink, i.e., the slave component applying the logical 0 to the LIN bus system 12 is connected to its IN-connection 19d, i.e., is located at its "IN" side.

To detect the direction of the current at the above observations points, the observations points, e.g., may comprise small shunt resistors, whereby a respective shunt resistor, e.g., may be connected between a respective IN- and OUT-connection of a respective slave component 13b, 13c, 13d.

The information detected by use of a respective observation point 30b, 30c, 30d by a respective slave component 13b, 13c, 13d, e.g., may be stored in a respective memory element or register of a respective slave component 13b, 13c, 13d, and may be read out by the master component 13a. When reading out the respective memory element or register of the respective slave component 13b, 13c, 13d, again, its respective slave identification number or address may be used.

In response to receiving the above memory element/register read out command from the master component 13a, and the above slave identification number or address, the respectively addressed slave component 13b, 13c, 13d may send the above information detected by use of a respective observation point 30b, 30c, 30d, and stored in the above memory element/register via the LIN bus system 12 to the master component 13a.

After the current direction as described above has been detected in the respective slave components (here: the slave components 13b, 13d), a different one of the slave components (e.g., the first slave component 13b instead of the second slave component 13c) is instructed to apply the above test signal for position evaluation, e.g., a logical 0 to the LIN bus system 12.

For this purpose, the master component 13a may again transmit respective command data over the LIN bus system 12, indicating that the first slave component 13b (instead of the second slave component 13c) shall now apply a logical 0 to the LIN bus system 12. To address the first slave component 13b, its respective slave identification number or address (here: SL_ID_1) may be used.

In response to receiving the above command from the master component 13a, and the above slave identification number or address (here: SL_ID_1), the first slave component 13b—under control of the respective LIN slave controller 14b—applies the above dominant logical level (i.e., a logical 0) to the LIN bus system 12.

Due to this, the addressed first slave component 13b acts as a current sink: Current, e.g., flows via the LIN bus transmission line 12a to the IN-connection 19b of the first slave component 13b, and via its data transmission resistor 16b to ground (GND). Correspondingly similar, due to the applied logical 0, current, e.g., flows through the third slave component 13d to its IN-connection 19d, then via the line 12c to the OUT-connection 20c of the second slave component 13c, and flows through the second slave component 13c to its IN-connection 19c, then via the line 12b to the OUT-connection 20b of the first slave component 13b, and via its data transmission resistor 16b to ground (GND).

As the above current flows from the OUT-connection 20c to the IN-connection 19c of the second slave component 13c, by use of the above observation point 30c, the second slave component 13c may detect that the current sink, i.e., the slave component applying the logical 0 to the LIN bus system 12 is connected to its IN-connection 19c, i.e., is located at its "IN" side. Similarly, as the above current flows from the inside of the third slave component 13d to its respective IN-connection 19d, by use of the above observation point 30d, the third slave component 13d may detect that the current sink, i.e., the slave component applying the logical 0 to the LIN bus system 12 is located at its "IN" side.

The information detected by use of the above observation points 30b, 30c, 30d, e.g., again may be stored in the above memory element or register of a respective slave component 13b, 13c, 13d, and may be read out by the master component 13a.

After the current direction as described above has been detected in the above slave components 13c, 13d, again, a different one of the slave components (e.g., the third slave component 13d instead of the first or second slave component 13b, 13c) may be instructed by the master component 13a to apply the above test signal for position evaluation, e.g., a logical 0 to the LIN bus system 12.

When, in response thereto, the third slave component 13d then applies a logical 0 to the LIN bus system 12, the third slave component 13d acts as a current sink.

Then, correspondingly similar as described above, by use of the above observation point 30b, the first slave component 13b may detect that the current sink, i.e., the slave component applying the logical 0 to the LIN bus system 12 is located at its "OUT" side. Similarly, by use of the above observation point 30c, the second slave component 13c may detect that the current sink, i.e., the slave component applying the logical 0 to the LIN bus system 12 is located at its "OUT" side.

The information detected by use of the above observation points 30b, 30c, 30d, e.g., again may be stored in the above memory element or register of a respective slave component 13b, 13c, 13d, and may be read out by the master component 13a.

By combining the information detected above during the above phases of the above method according to an embodiment of the invention, the master component 13a may exactly detect where in the LIN bus system 12 a respective slave component 13b, 13c, 13d is located, e.g., which of the above slave components—with respect to the master component 13a—is the "first" slave component in the chain, which is the "second" slave component in the chain, which is the "third" slave component in the chain, etc. By the location of a respective slave component in the chain, e.g., the functionality of the respective component may be defined.

The bus systems described herein can be used in a number of applications. As a result of the relatively simple and cost-effective construction of LIN bus systems, they are often employed for the control of divided electrical systems in non-critical environments in terms of chronology and/or security, for instance for the communication between local control units, sensors or actuators in respective automotive applications, and others.

In one example, electronic systems as described herein can be used in vehicles, such as cars, trucks and motorcycles. Possible applications are, for instance, the micro-controller and/or micro-processor based control of DC and stepping motors for electrical window-winders and wing mirrors, the adjustment of headlight dipping, the management of sensor information for the control of air-conditioners, seat positions, front and back doors, etc.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method to address components connected to a local interconnect network (LIN) bus system, the method comprising:
    determining that a test signal is being applied to the LIN bus system; and
    determining a location of a first slave component in the LIN bus system by detecting a direction of a current of the test signal through the first slave component, wherein the test signal is applied to the bus system by a second slave component, and wherein determining the location of the first slave component in the bus system comprises:
        determining that the first slave component is positioned in-between a master component and the second slave component on the bus system when the current of the test signal flows in a first direction through the first slave component, wherein the current of the test signal flows from a first connection on the LIN bus of the first slave component to a second connection on the LIN bus of the first slave component when flowing in the first direction through the first slave component, and wherein a resistor and an amplifier are directly connected to the first connection; and
        determining that the second slave component is positioned in-between the master component and the first slave component on the bus system when the current of the test signal flows in a second direction through the first slave component, wherein the current of the test signal flows from the second connection of the first slave component to the first connection of the first slave component when flowing in the second direction through the first slave component.

2. The method of claim 1, wherein the LIN bus system comprises one single transmission line.

3. The method of claim 1, wherein the LIN bus system comprises a plurality of transmission lines.

4. The method of claim 1, wherein the test signal is applied to the LIN bus system by the master component.

5. The method of claim 1, wherein the first and second slave components are configured to be controlled by the master component.

6. The method of claim 5, wherein the test signal is applied to the LIN bus system by the second slave component in response to a command from the master component.

7. The method of claim 6, wherein the test signal comprises a dominant logical 0 or dominant logical 1.

8. The method of claim 6, further comprising assigning a unique slave identification number or address to the first and second components by the master component.

9. The method of claim 8, wherein assigning the unique slave identification number or address comprises sending a device identification number of the first and second components to the master component.

10. The method of claim 1, wherein detecting the direction of the current of the test signal through the first component comprises detecting the direction of the current through a shunt resistor in the first component.

11. A system comprising:
    a local interconnect network (LIN) bus system configured to transport a test signal; and
    a plurality of slave components connected to the LIN bus system, wherein a first slave component in the plurality of slave components is configured to detect a direction of a current of the test signal through the first slave component to determine a location of the first slave component on the LIN bus system, wherein a second component in the plurality of slave components is configured to apply the test signal to the LIN bus system, and
    wherein the first slave component is configured to detect the direction of the current of the test signal through the first slave component to determine the location of the first slave component by:
        determining that the first slave component is positioned in-between a master component and a second slave component on the LIN bus system when the current of the test signal flows in a first direction through the first slave component, wherein the current of the test signal flows from a first connection on the LIN bus of the first slave component to a second connection on the LIN bus of the first slave component when flowing in the first direction through the first slave component, and wherein a resistor and an amplifier are directly connected to the first connection; and
        determining that the second slave component is positioned in-between the master component and the first slave component on the LIN bus system when the current of the test signal flows in a second direction through the first slave component, wherein the current of the test signal flows from the second connection of the first slave component to the first connection of the first slave component when flowing in the second direction through the first slave component.

12. The system of claim 11, wherein the LIN bus system comprises a single transmission line.

13. The system of claim 11, wherein the LIN bus system comprises a plurality of transmission lines.

14. The system of claim 11, wherein the first slave component comprises a first connection, a second connection, and a shunt resistor coupling the first connection to the second connection, and wherein the first slave component is configured to determine the location of the first slave component on the LIN bus system by:
  determining that the first connection is coupled to the second slave component when the current of the test signal flows from the first connection towards the shunt resistor; and
  determining that the second connection is coupled to the second slave component when the current of the test signal flows from the second connection to the shunt resistor.

15. A vehicle comprising:
  a local interconnect network (LIN) bus system;
  a plurality of components connected to the LIN bus system including at least a first component and a second component, wherein the first component is configured to detect a direction of a current of a test signal through the first component to determine a location of the first component relative to the second component on the LIN bus system; and
  a plurality of vehicle devices, each vehicle device electrically coupled to a respective one of the plurality of components, wherein the second component is configured to apply the test signal to the LIN bus system, and
  wherein the first component is configured to detect the direction of the current through the first component to determine the location of the first component relative to the second component on the LIN bus system by:
    determining that the first component is positioned in-between a master component and the second component on the LIN bus system when the current of the test signal flows in a first direction through the first component, wherein the current of the test signal flows from a first connection on the LIN bus of the first slave component to a second connection on the LIN bus of the first slave component when flowing in the first direction through the first slave component, and wherein a resistor and an amplifier are directly connected to the first connection; and
    determining that the second component is positioned in-between the master component and the first component on the LIN bus system when the current of the test signal flows in a second direction through the first component, wherein the current of the test signal flows from the second connection of the first component to the first connection of the first component when flowing in the second direction through the first component.

16. The vehicle of claim 15, wherein the vehicle is a car or a truck or a motorcycle.

17. The vehicle of claim 15, wherein each vehicle device comprises a device selected from the group consisting of a motor for an electrical window-winder, a motor for a side view mirror, a device configured to adjust a headlight, a device configured to adjust a seat position, and a door sensor.

18. A method comprising:
  assigning a unique address to each of a plurality of components connected to a local interconnect network (LIN) bus system, and
  determining a position of a first component in the plurality of components on the LIN bus system by detecting a direction of a test signal current through the first component, wherein the test signal current is applied to the LIN bus system by a second component, and wherein determining the position of the first component in the LIN bus system comprises:
    determining that the first component is positioned in-between a master component and the second component on the LIN bus system when the test signal current flows in a first direction through the first component, wherein the current of the test signal flows from a first connection on the LIN bus of the first slave component to a second connection on the LIN bus of the first slave component when flowing in the first direction through the first slave component, and wherein a resistor and an amplifier are directly connected to the first connection; and
    determining that the second component is positioned in-between the master component and the first component on the LIN bus system when the test signal current flows in a second direction through the first component, wherein the test signal current flows from the second connection of the first component to the first connection of the first component when flowing in the second direction through the first component.

19. A system comprising:
  a local interconnect network (LIN) bus system; and
  a means for determining a location of a first component in the LIN bus system by detecting a direction of a current of a test signal through the first component, wherein the test signal is applied to the LIN bus system by a second component, and wherein the means for determining the location of the first component in the LIN bus system comprises:
    a means for determining that the first component is positioned in-between a master component and the second component on the LIN bus system when the current of the test signal flows in a first direction through the first component, wherein the current of the test signal flows from a first connection on the LIN bus of the first slave component to a second connection on the LIN bus of the first slave component when flowing in the first direction through the first slave component, and wherein a resistor and an amplifier are directly connected to the first connection; and
    a means for determining that the second component is positioned in-between the master component and the first component on the LIN bus system when the current of the test signal flows in a second direction through the first component, wherein the test signal current flows from the second connection of the first component to the first connection of the first component when flowing in the second direction through the first component.

20. The system of claim 19, wherein the means for determining the location of the first component in the LIN bus system further comprises:
  a means for detecting the direction of the current through a shunt resistor in the first component.

21. The method of claim 18, wherein determining the position of the first component in the LIN bus system comprises detecting the direction of the test signal current through a shunt resistor in the first component.

22. The vehicle of claim 15, wherein the first component is configured to determine the location of the first component relative to the second component on the LIN bus system by detecting the direction of the current through a shunt resistor in the first component.

* * * * *